(12) United States Patent
Shinkai

(10) Patent No.: US 12,688,450 B2
(45) Date of Patent: Jul. 21, 2026

(54) QUANTUM INFORMATION PROCESSING DEVICE AND QUANTUM INFORMATION PROCESSING SYSTEM

(71) Applicant: Hitachi, Ltd., Tokyo (JP)

(72) Inventor: Go Shinkai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 636 days.

(21) Appl. No.: 18/109,358

(22) Filed: Feb. 14, 2023

(65) Prior Publication Data

US 2024/0037437 A1 Feb. 1, 2024

(30) Foreign Application Priority Data

Jul. 28, 2022 (JP) ................................. 2022-121034

(51) Int. Cl.
*G06N 10/40* (2022.01)

(52) U.S. Cl.
CPC .................................... *G06N 10/40* (2022.01)

(58) Field of Classification Search
USPC ........................................................ 716/100
See application file for complete search history.

(56) References Cited

U.S. PATENT DOCUMENTS

| | | | |
|---|---|---|---|
| 2021/0296556 A1* | 9/2021 | Hsu .................... | H10D 48/3835 |
| 2021/0326738 A1 | 10/2021 | Kanno et al. | |
| 2022/0190135 A1* | 6/2022 | Kotlyar ............. | H10D 30/6735 |
| 2022/0292383 A1 | 9/2022 | Lee et al. | |
| 2023/0026518 A1* | 1/2023 | Burchard ............... | H10D 64/27 |
| 2024/0289665 A1* | 8/2024 | Pichler .................. | G06N 10/20 |

FOREIGN PATENT DOCUMENTS

| | | |
|---|---|---|
| JP | 2021-27142 A | 2/2021 |
| JP | 2021-170198 A | 10/2021 |

OTHER PUBLICATIONS

Japanese Office Action received in corresponding Japanese Application No. 2022-121034 dated Jan. 6, 2026.

* cited by examiner

*Primary Examiner* — Suchin Parihar
(74) *Attorney, Agent, or Firm* — MATTINGLY & MALUR, PC

(57) ABSTRACT

A quantum information processing device includes a control unit controlling a quantum bit array, and a common control gate line capable of controlling a plurality of quantum bits, the common control gate line is commonly connected to each of the plurality of transistors, and the control unit performs control such that the number of quantum bits operated in the quantum bit array is less than or equal to half the total number of transistors.

7 Claims, 15 Drawing Sheets

F I G. 1
STATE OF ELECTRON         NUMBER
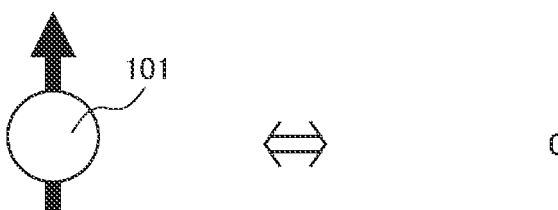
0
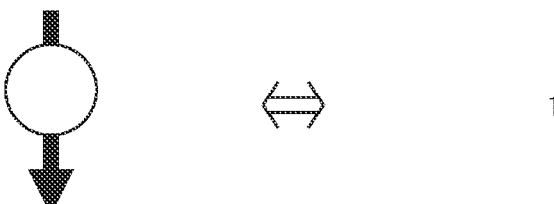
1

F I G. 3
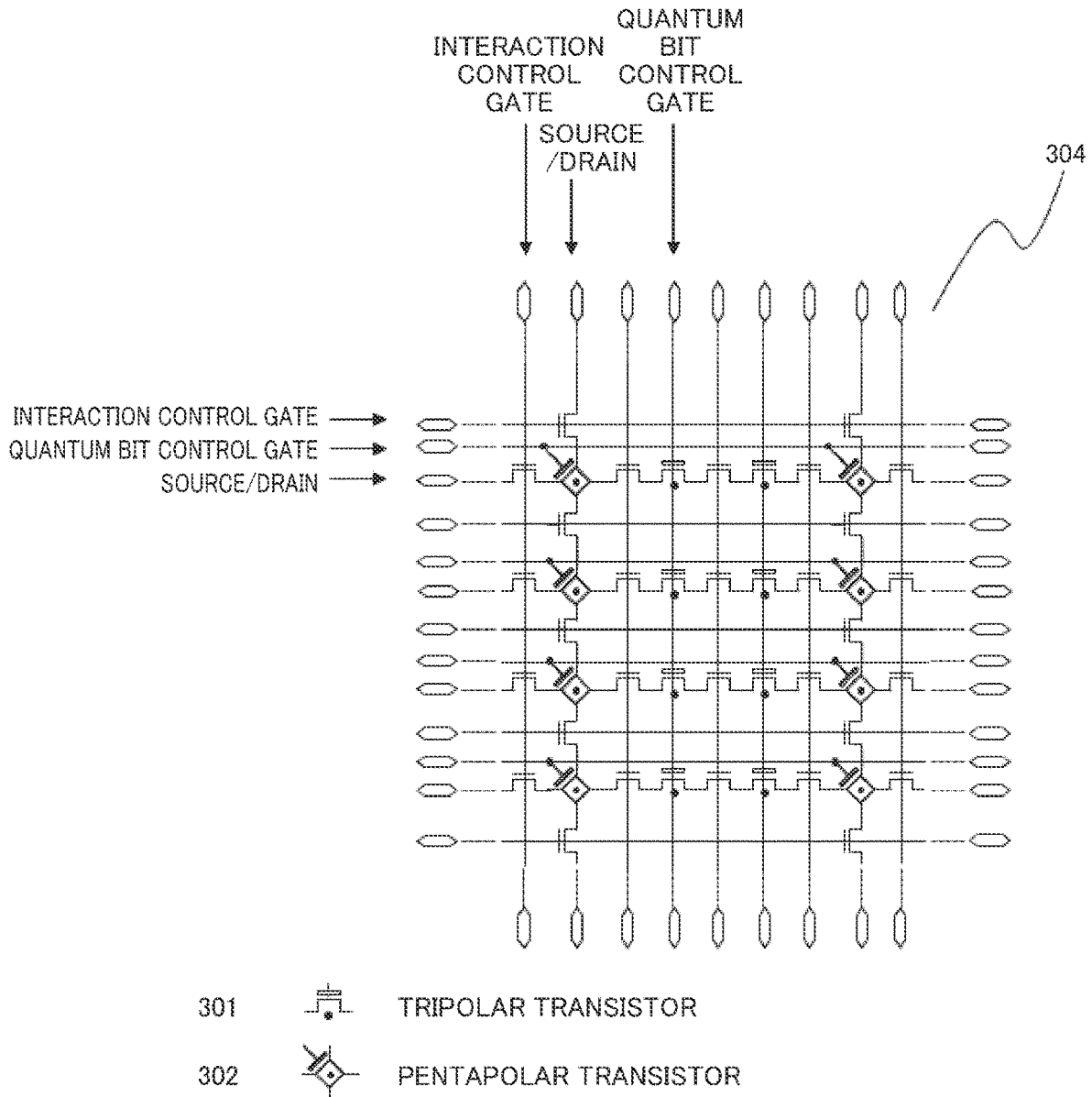

F I G. 4
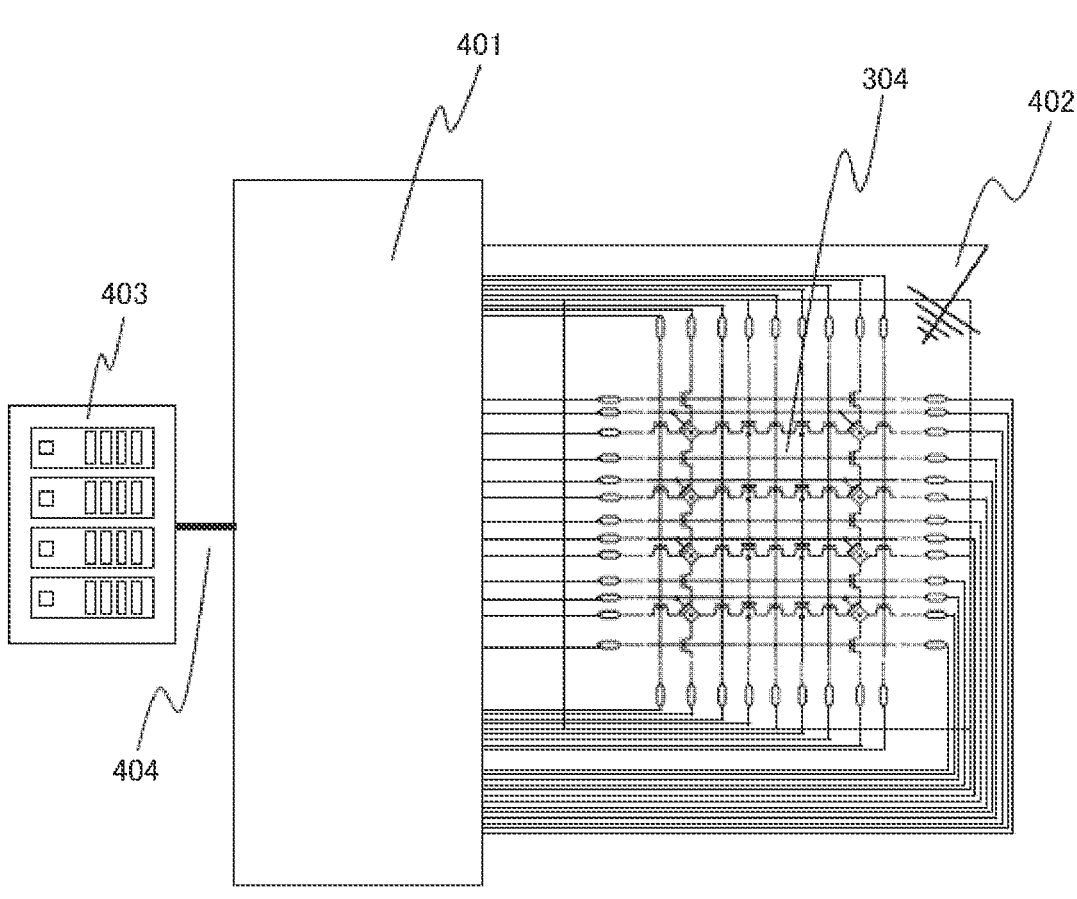

F I G. 5
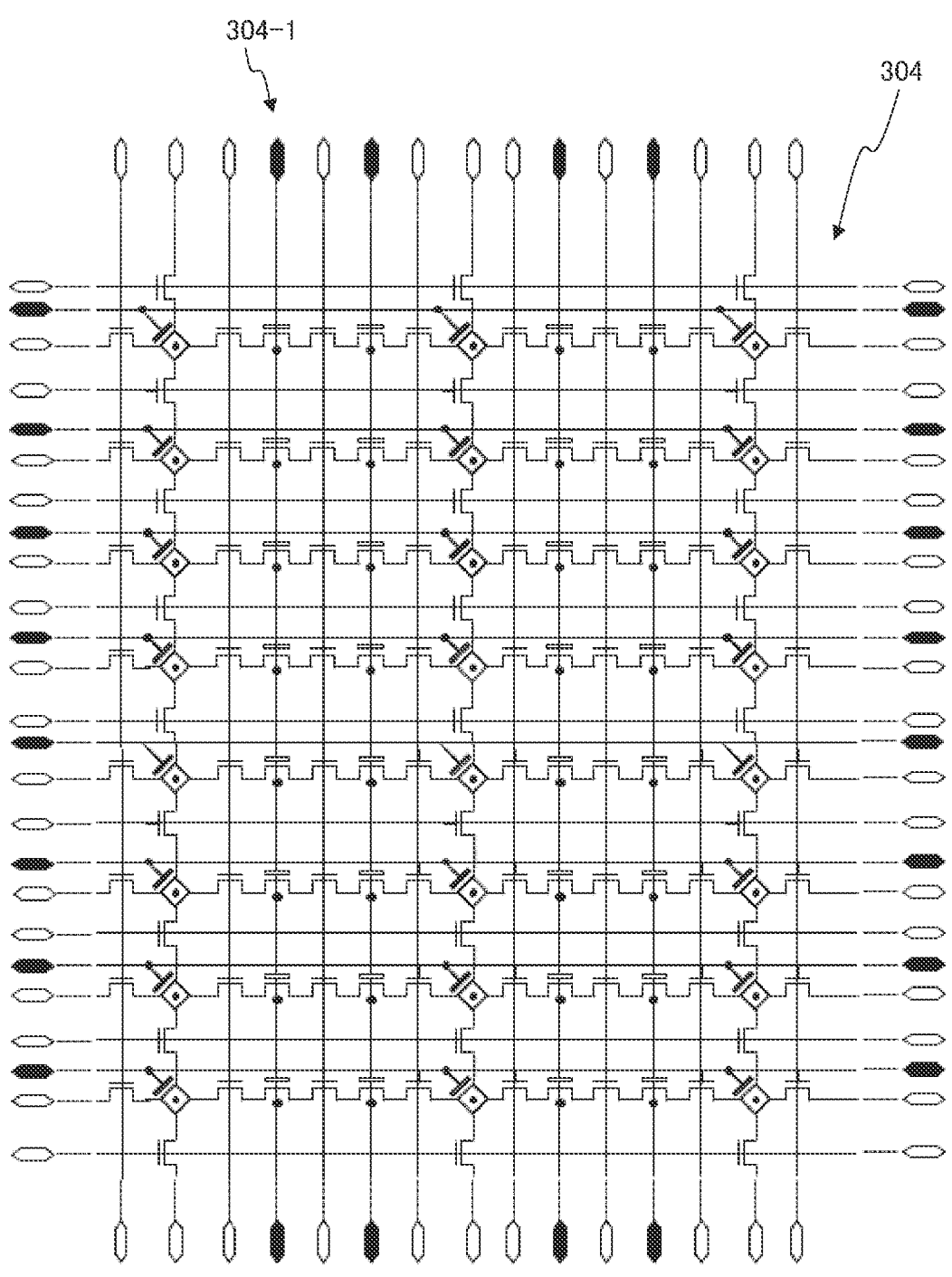

F I G . 6
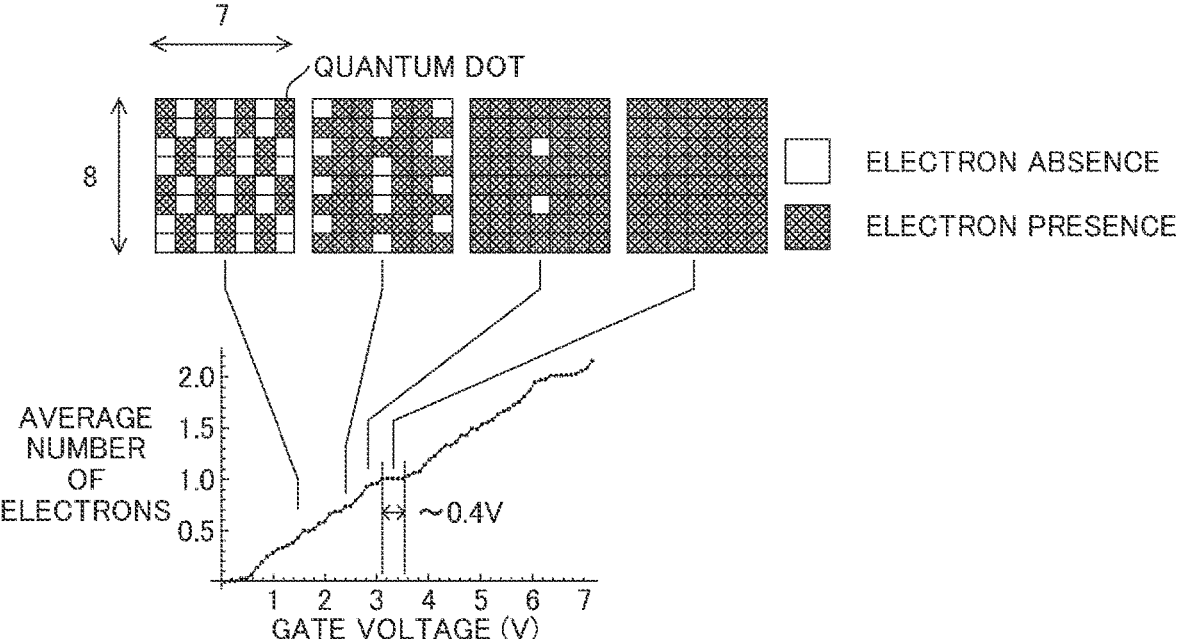
F I G . 7
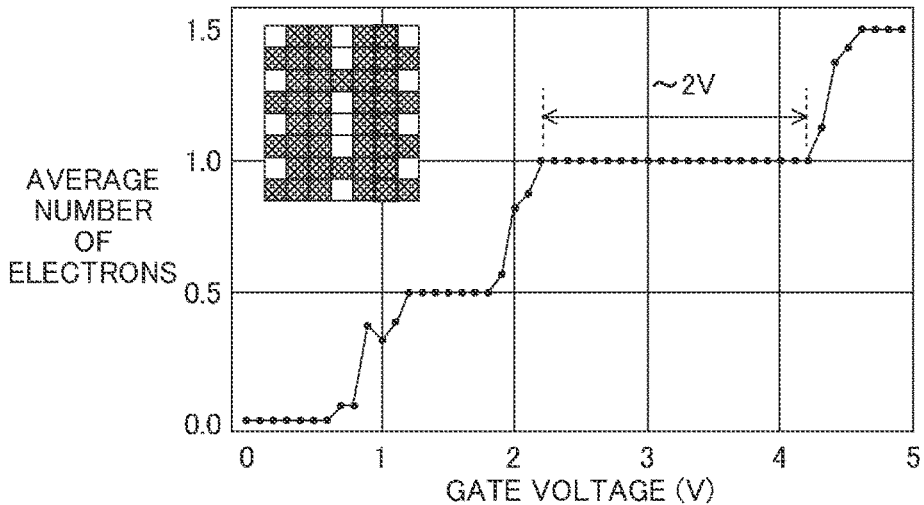

F I G. 8
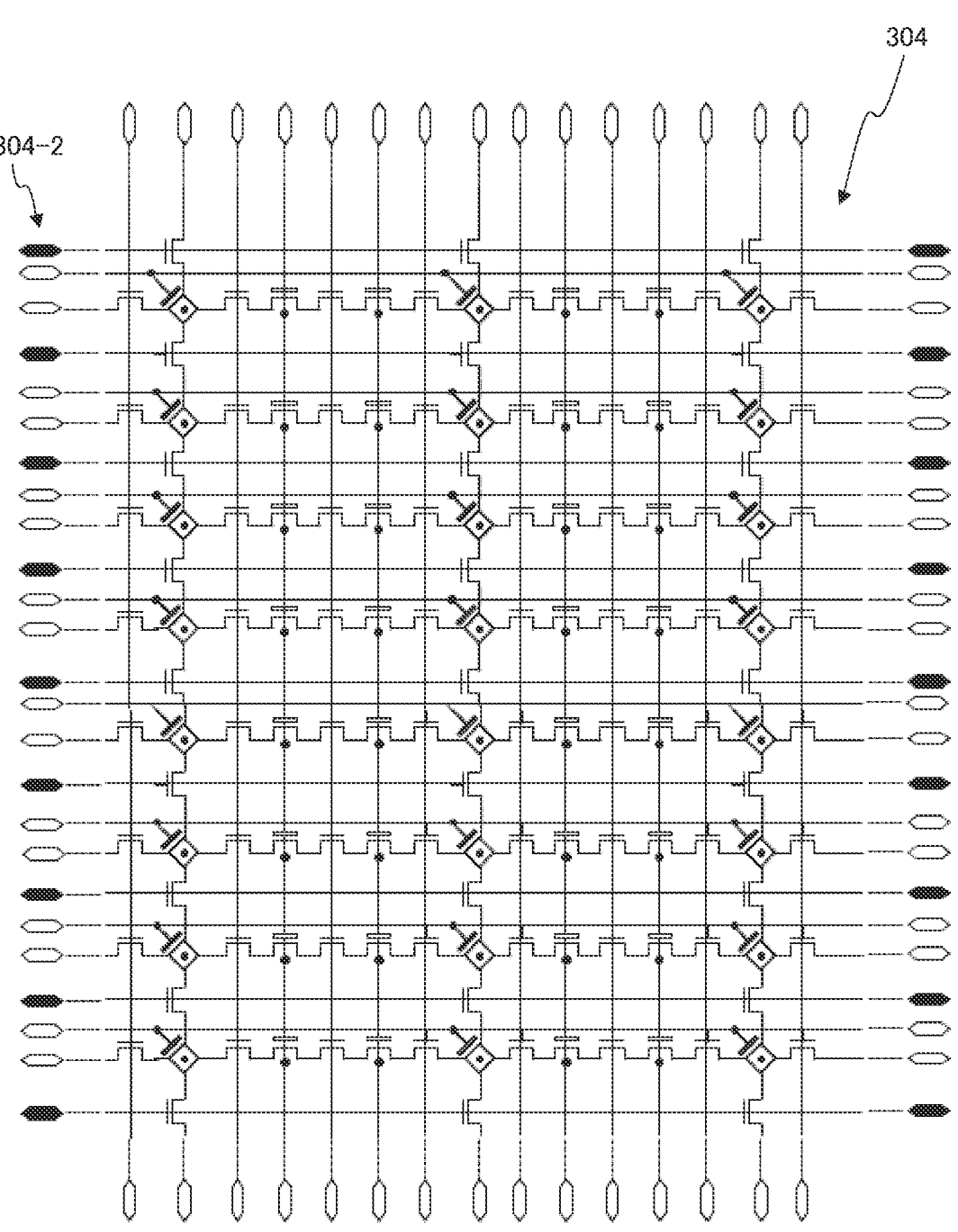

F I G . 9
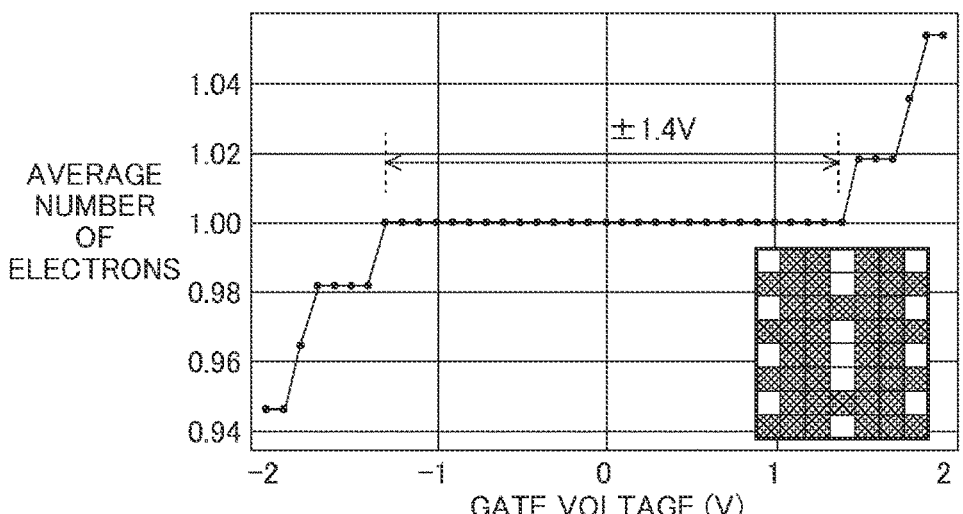
F I G . 1 0
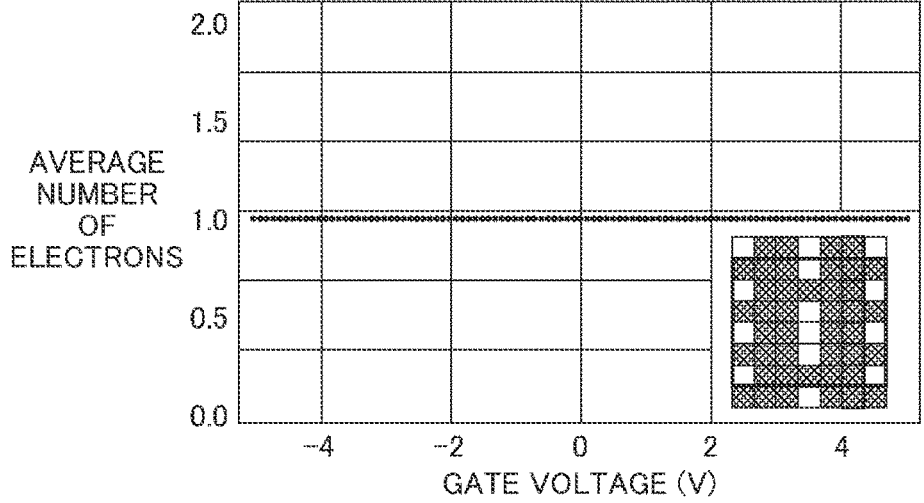

F I G . 1 1
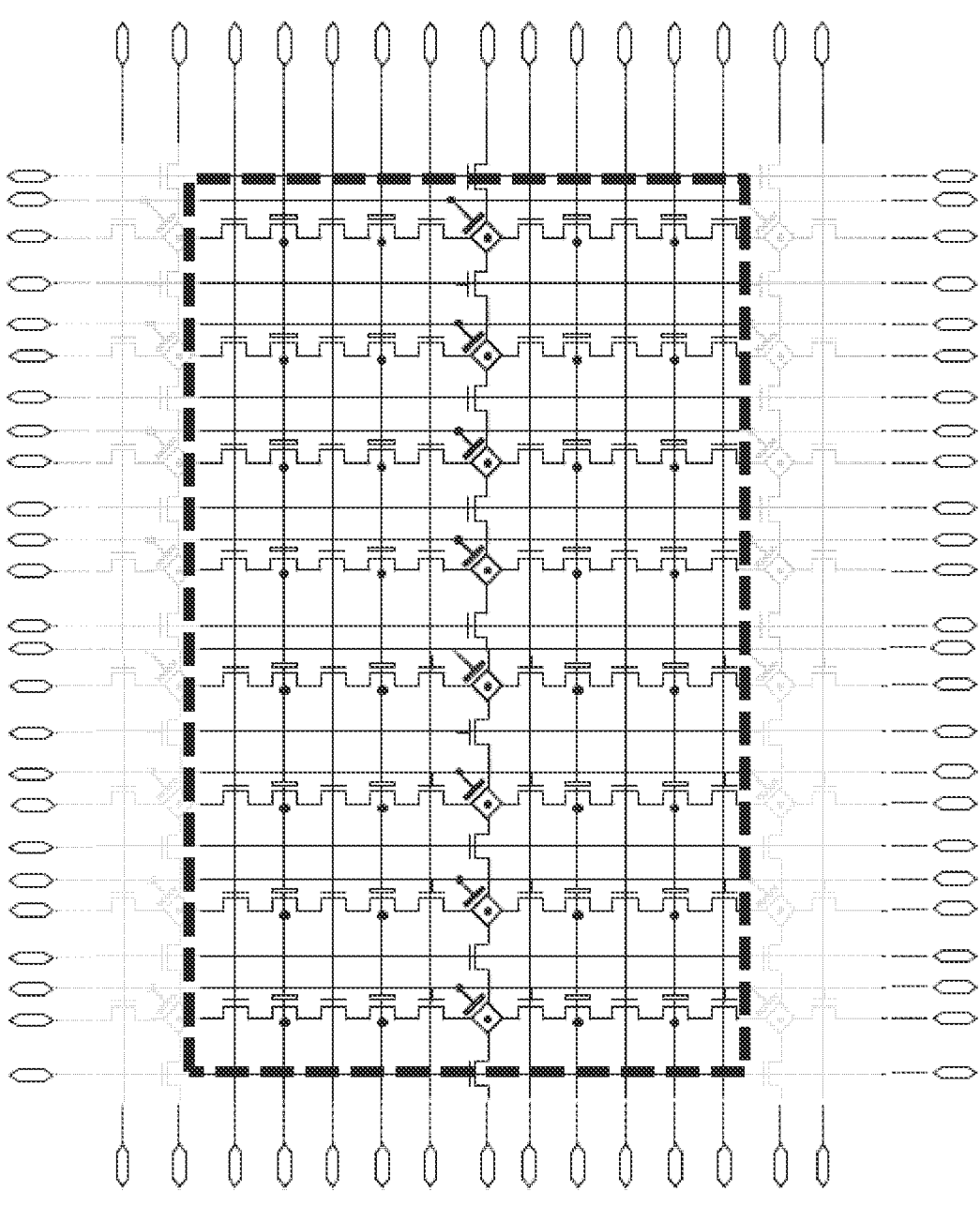

F I G . 1 2
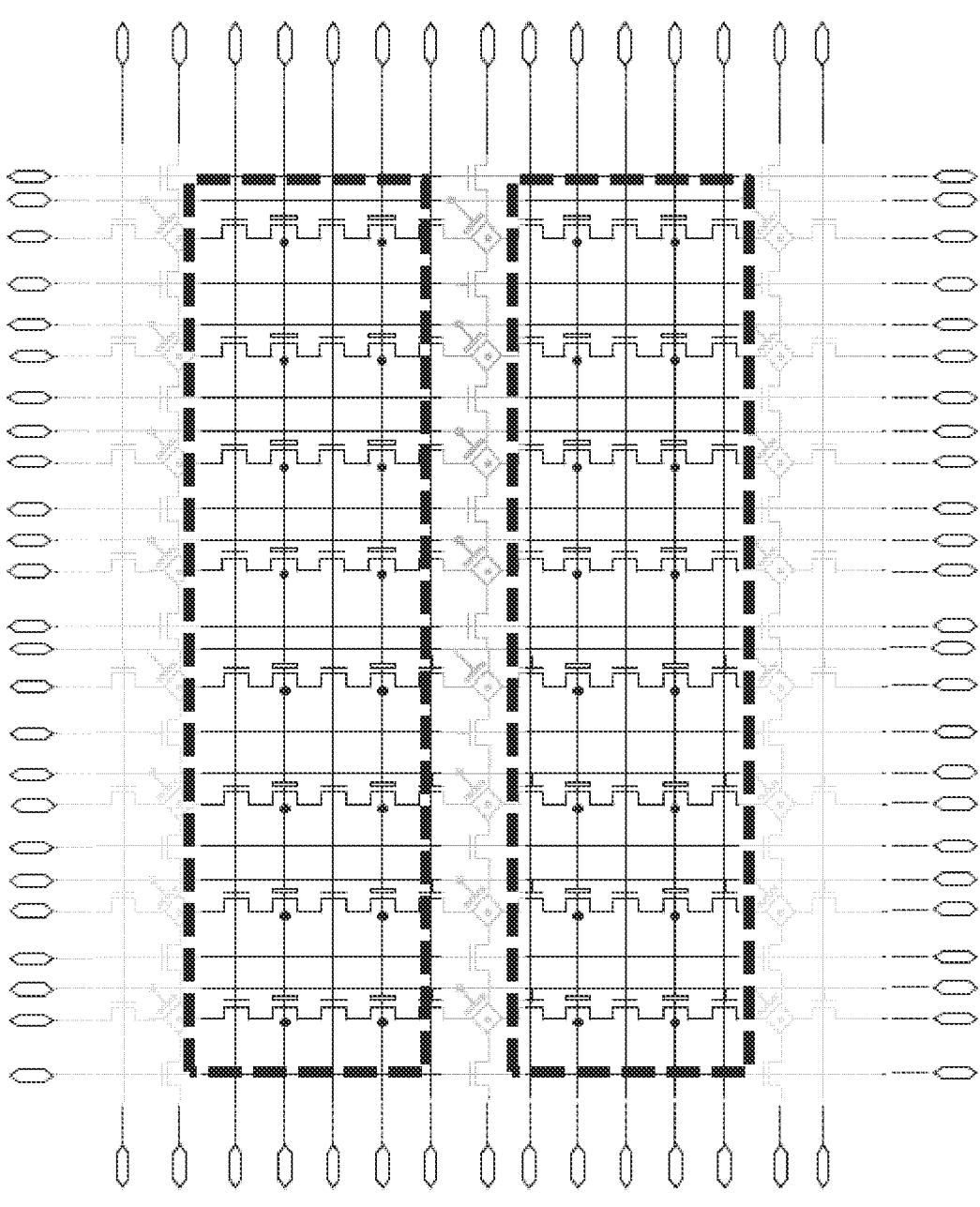

F I G . 1 3
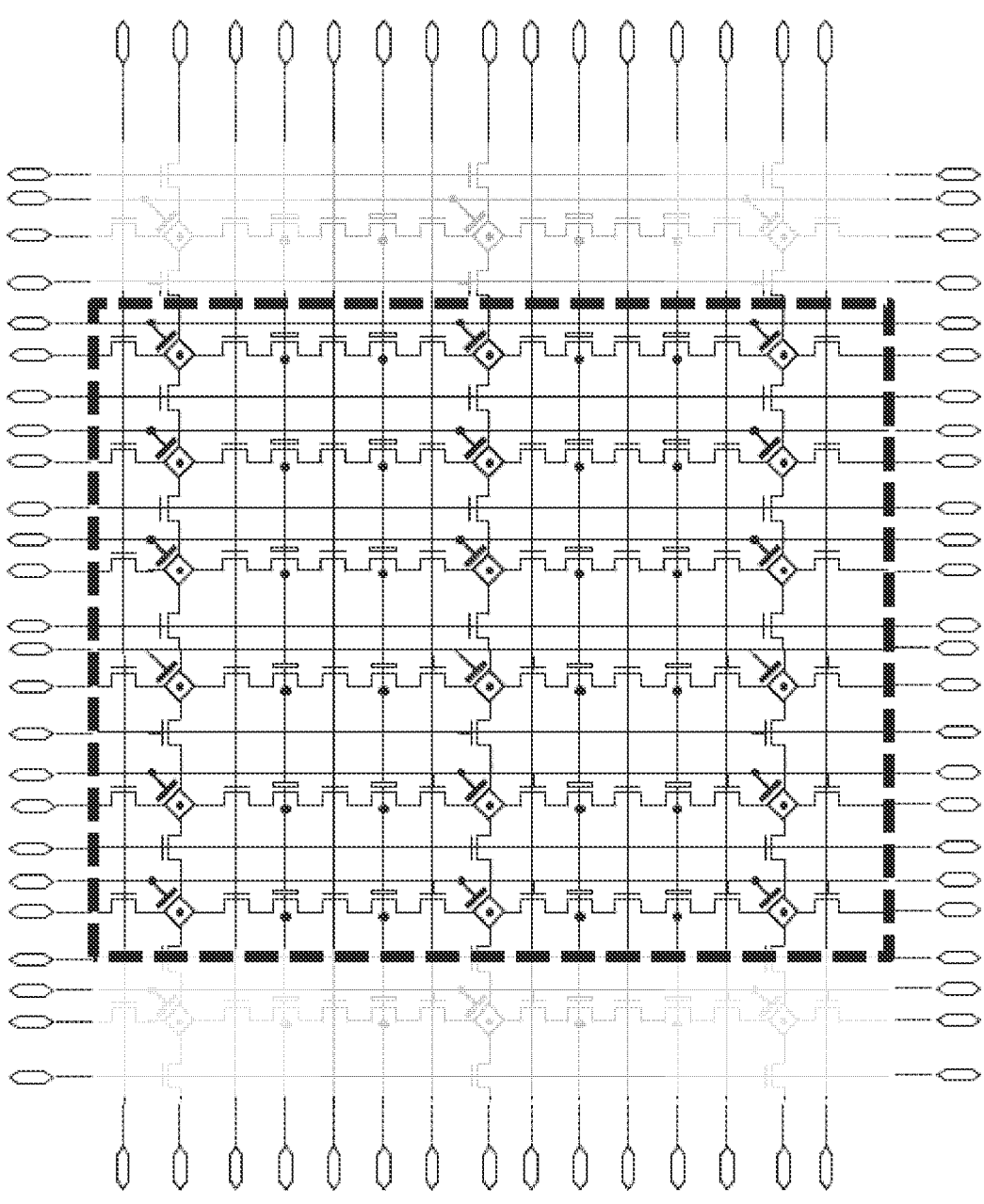

F I G. 1 4
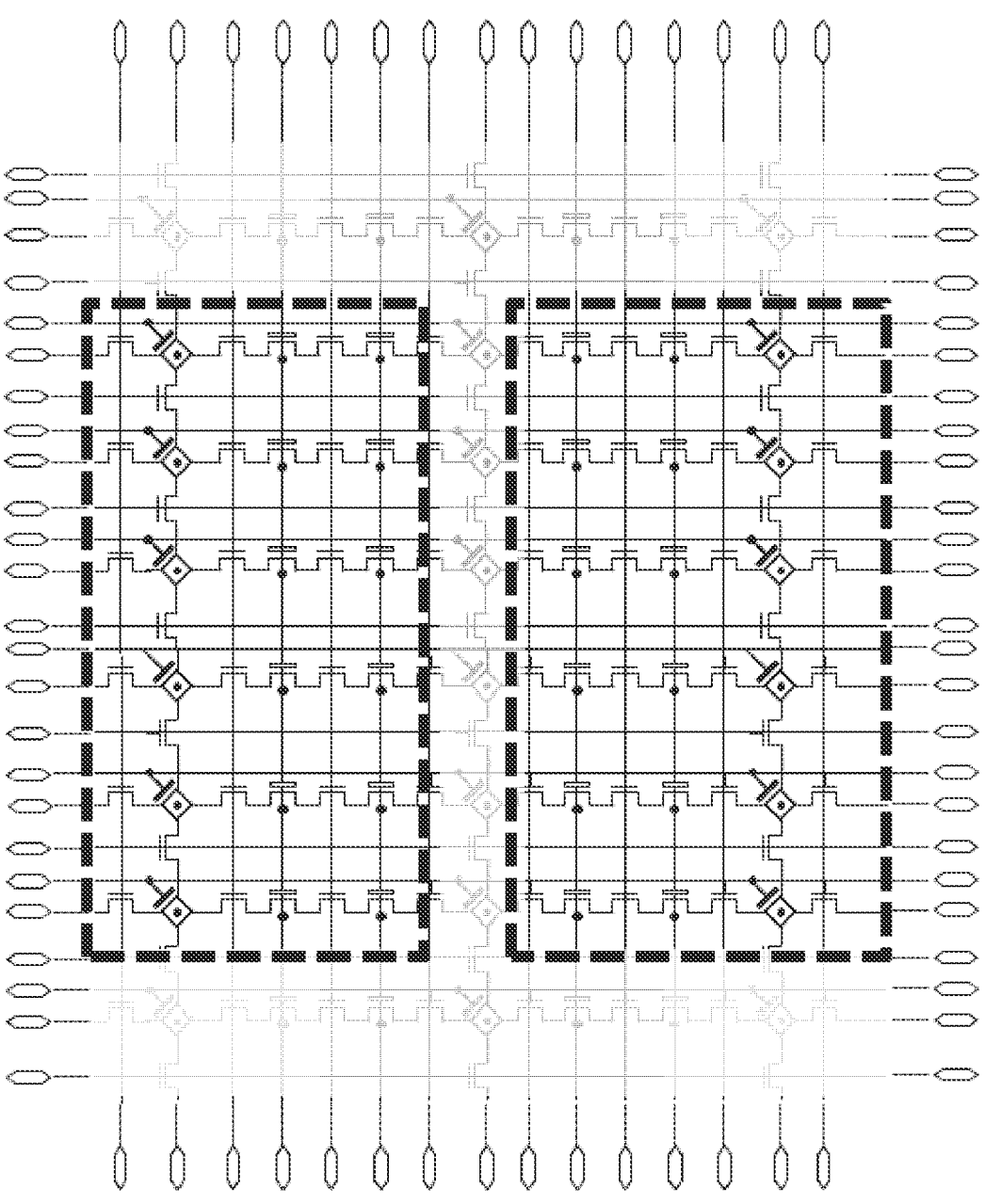

F I G. 1 5
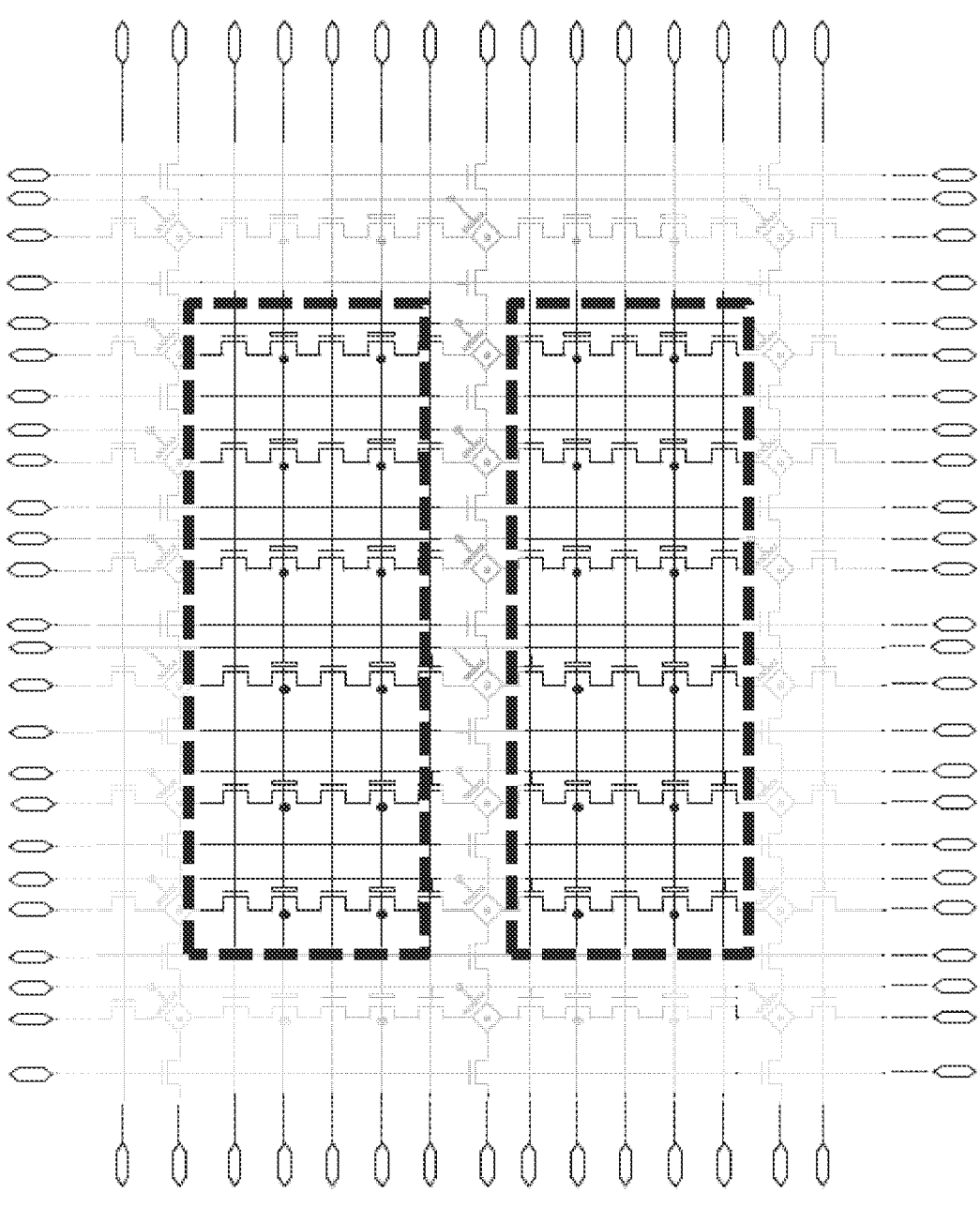

F I G. 1 6
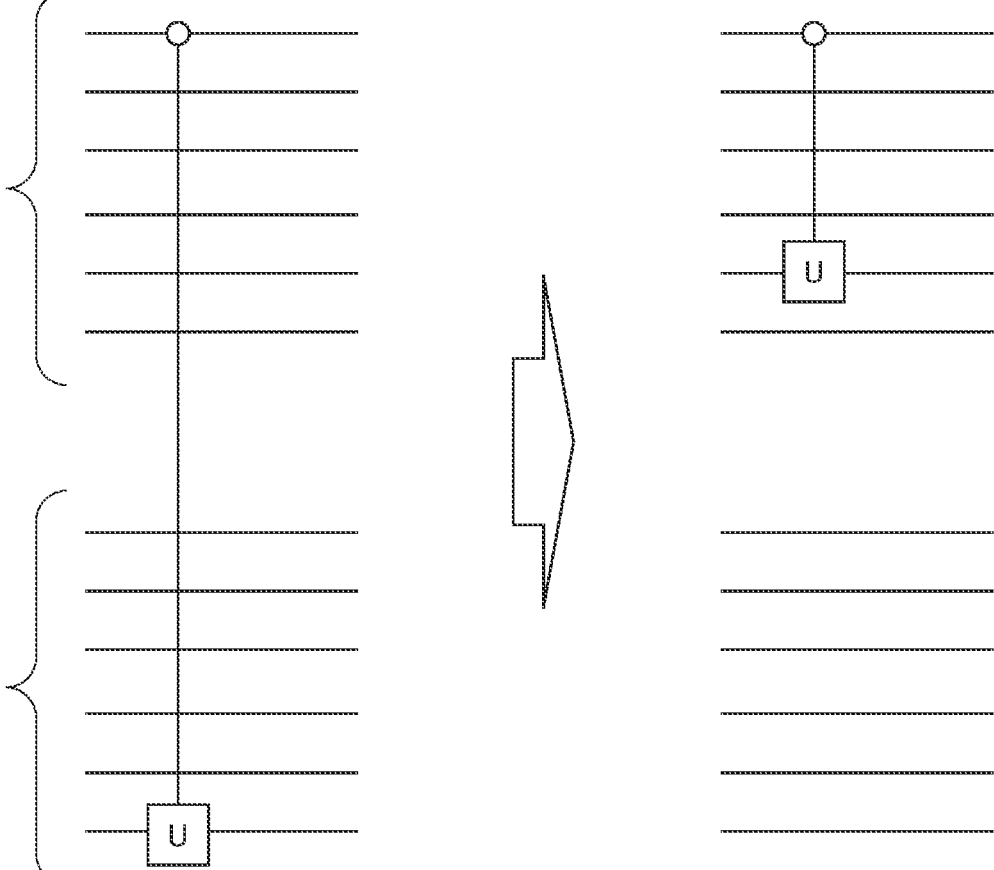
OPERATION REQUIRED FOR
QUANTUM PROCESSOR
OPERATION EXECUTED BY
QUANTUM PROCESSOR F I G. 1 7
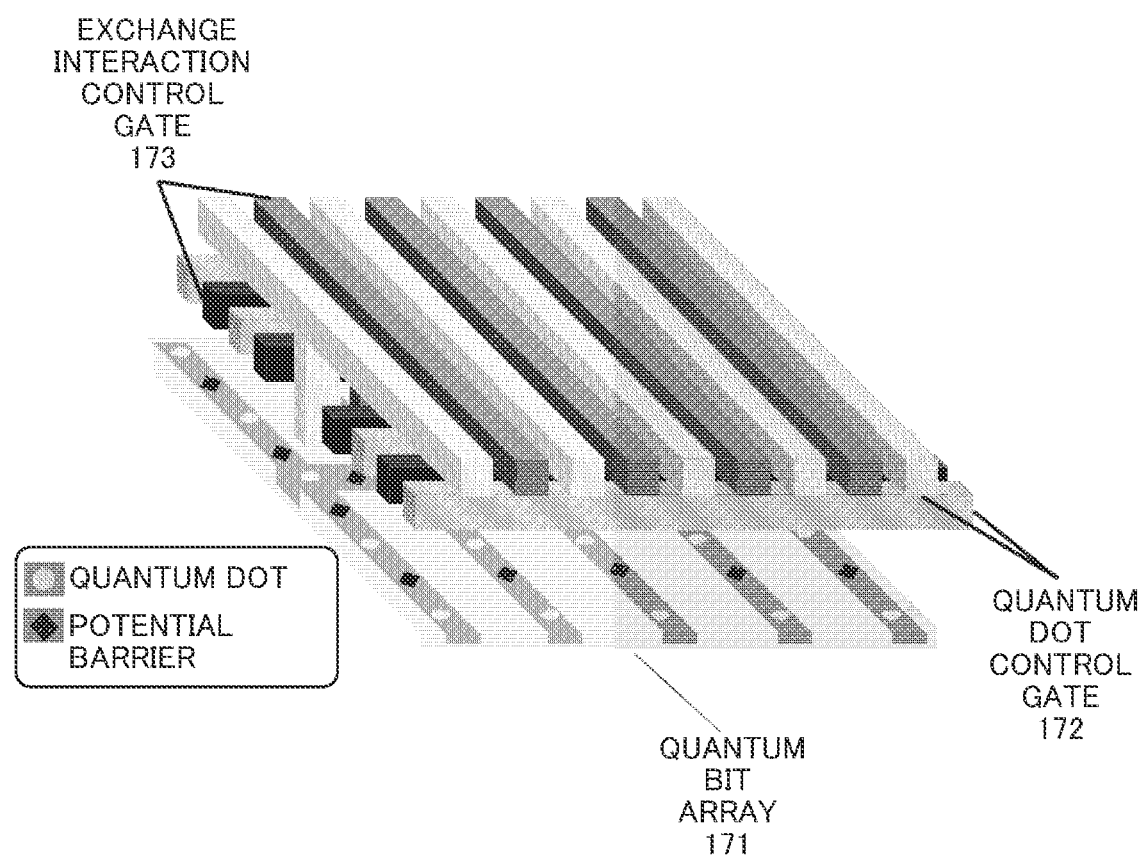
EXCHANGE
INTERACTION
CONTROL
GATE
173
QUANTUM DOT
POTENTIAL
BARRIER
QUANTUM
DOT
CONTROL
GATE
172
QUANTUM
BIT
ARRAY
171

QUANTUM INFORMATION PROCESSING DEVICE AND QUANTUM INFORMATION PROCESSING SYSTEM

CROSS-REFERENCE TO RELATED APPLICATION

The present application claims priority from Japanese application JP2022-121034, filed on Jul. 28, 2022, the contents of which is hereby incorporated by reference into this application.

BACKGROUND OF THE INVENTION

1. Field of the Invention

The invention relates to a quantum information processing device and a quantum information processing system.

2. Description of the Related Art

A quantum computer is capable of performing high-speed information processing compared to the existing computer, and thus, has attracted attention. The existing computer handles binary values of 0 and 1, whereas the quantum computer handles a superposition state of the binary values.

A quantum operation is attained by performing a manipulation suitable for each quantum bit or two quantum bits. It is known that an any manipulation can be attained by a combination of two types of one-quantum bit operations and one type of two-quantum bit operation.

A semiconductor quantum bit is a quantum bit generated from the silicon semiconductor engineering that supports the modern information-intensive society. The semiconductor quantum bit is a method in which a single electron is trapped by an electrostatic effect, and the direction of the spin of the electron is associated with 0 or 1.

The integration of the semiconductor quantum bit includes two methods of a method for providing an individual gate electrode for trapping an electron on each quantum bit and a method (a common gate electrode method) of arranging the quantum bit into the shape of an array by using a gate electrode common to a plurality of quantum bits. The method for providing the individual gate electrode for trapping an electron on each of the quantum bits remains at the proposal of an idea due to the difficulty of wiring.

Examples of a technology relevant to the common gate electrode method for arranging the quantum bit into the shape of an array by using the gate electrode common to the plurality of quantum bits include JP 2021-27142 A.

SUMMARY OF THE INVENTION

A quantum processor of the common gate electrode method improves integration properties, but sacrifices individual controllability of the quantum bit due to the commonalization of the gate electrode. One of functions required for a quantum processor in which a quantum bit of an electron spin method is adopted is to trap an electron that is used as a quantum bit.

The electron is trapped by applying a voltage to the gate electrode. Due to a coulomb interaction between the electrons to be trapped, a gate voltage required for trapping the electron is not necessarily the same for all the electrons in the quantum processor. Therefore, in the common gate electrode method, it is necessary to design that the electron can be trapped in a constant voltage margin.

However, since voltage margins of the electrons functioning as the quantum bit are different from each other in the quantum processor, an operation error may occur due to weak electron trapping.

An object of the invention is to reduce an operation error due to weak electron trapping, in a quantum information processing device.

A quantum information processing device of one aspect of the invention, including: a quantum bit array in which a plurality of quantum bits are arranged into the shape of a two-dimensional tetragonal lattice; a control unit controlling the quantum bit array; and a common control gate line capable of controlling the plurality of quantum bits, in which the common control gate line is commonly connected to each of a plurality of transistors, and the control unit performs control such that the number of quantum bits operated in the quantum bit array is less than or equal to half the total number of transistors.

According to one aspect of the invention, in the quantum information processing device, an operation error due to weak electron trapping can be reduced.

BRIEF DESCRIPTION OF THE DRAWINGS

FIG. 1 is an explanatory diagram of a quantum bit using a state of an electron spin;

FIG. 3 is a circuit diagram of a quantum processor including a quantum bit of the electron spin method in which a common gate method is adopted;

FIG. 4 is a configuration conceptual diagram of a quantum computer;

FIG. 5 is a diagram illustrating an example of gate voltage application of the quantum processor;

FIG. 6 is a diagram illustrating an example of the gate voltage application and the subsequent electron trapping in the quantum processor;

FIG. 7 is a diagram illustrating an example of the gate voltage application and the subsequent electron trapping in the quantum processor with a restricted use region;

FIG. 8 is a diagram illustrating another example of the gate voltage application of the quantum processor;

FIG. 9 is a diagram illustrating an example of the gate voltage application and the subsequent electron trapping in the quantum processor;

FIG. 10 is a diagram illustrating an example of the gate voltage application and the subsequent electron trapping in the quantum processor with the restricted use region;

FIG. 11 is a diagram illustrating an example of the restricted use region of the quantum processor;

FIG. 12 is a diagram illustrating an example of the restricted use region of the quantum processor;

FIG. 13 is a diagram illustrating an example of the restricted use region of the quantum processor;

FIG. 14 is a diagram illustrating an example of the restricted use region of the quantum processor;

FIG. 15 is a diagram illustrating an example of the restricted use region of the quantum processor;

FIG. 16 is a diagram illustrating an example of an algorithm for restricting the use region of the quantum processor; and FIG. 17 is a diagram illustrating a state of a quantum device in which quantum dots are arranged into the shape of an array.

DETAILED DESCRIPTION OF THE PREFERRED EMBODIMENTS

Figure 2:
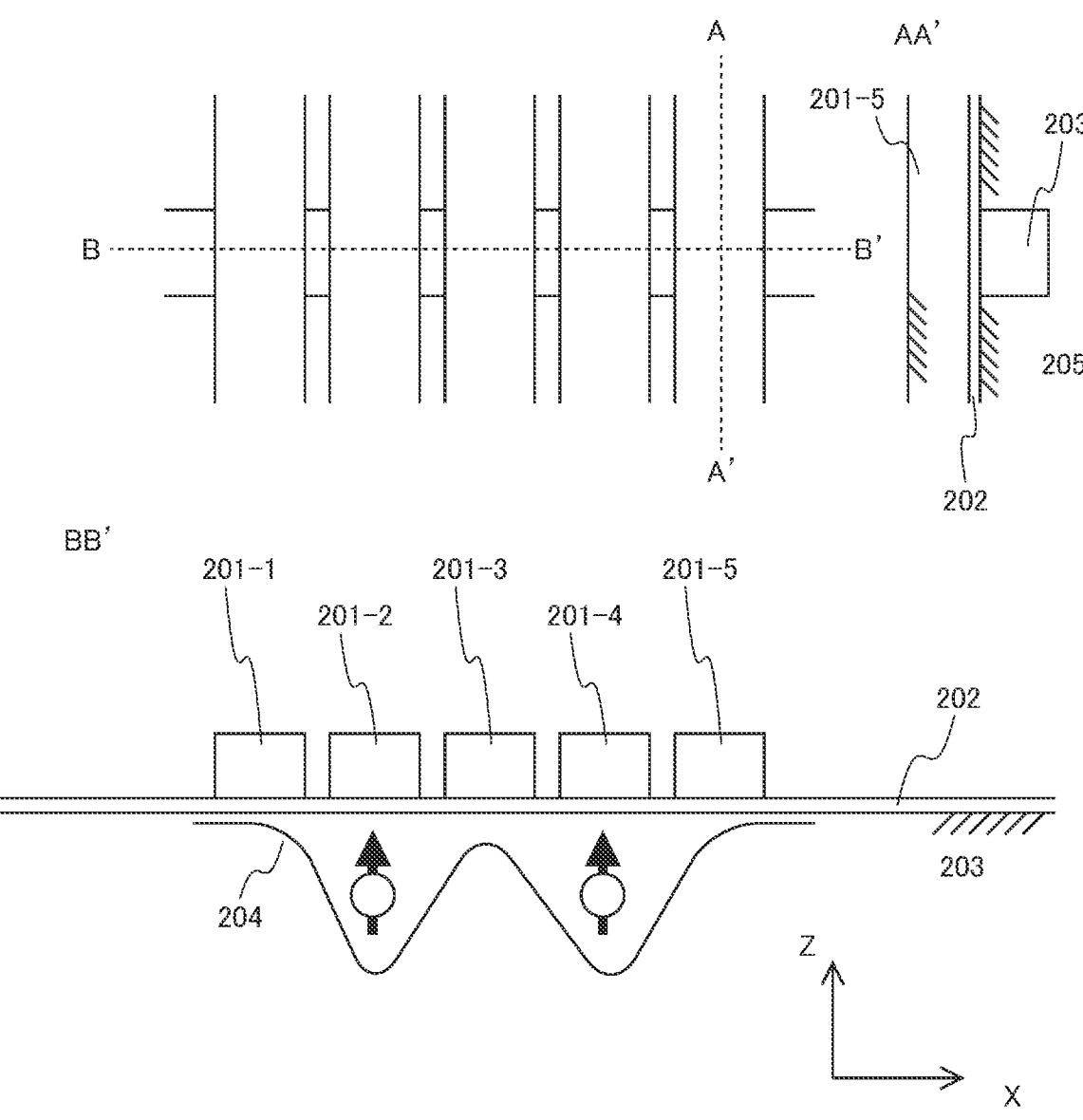
FIG. 2 is a diagram illustrating a basic structure of a quantum bit semiconductor device of an electron spin method.

Hereinafter, an example will be described in detail by using the drawings. Here, the invention is not to be construed as being limited to the following description of the example. It is easily understood by a person skilled in the art that a specific configuration of the invention can be changed within a range not departing from the idea or gist of the invention.

In the following configuration of the invention, the same reference numeral may be used in common for the same constituent or a constituent having a similar function in different drawings, and the repeated description may be omitted. In a case where there are a plurality of constituents having the same or similar function, the constituents may be described by applying different suffixes. Here, the suffix may be omitted.

In addition, a reference numeral for identifying a constituent is used for each context, and the reference numeral used in one context does not necessarily indicate the same constituent in another context. In addition, a constituent identified by a certain reference numeral may have the function of a constituent identified by another reference numeral.

In order to facilitate understanding of the invention, the position, size, shape, range, and the like of each configuration illustrated in the drawings and the like may not represent the actual position, size, shape, range, and the like. Accordingly, the invention is not necessarily limited to the position, size, shape, range, and the like illustrated in the drawings and the like.

Hereinafter, an example will be described by using the drawings.

EXAMPLE

FIG. 1 illustrates the state of an electron spin or a hole spin and the associated value, as an example.

A symbol including a circle and an arrow in the drawing is a stylized image of an electron spin 101. As described above, the electron spin 101 is expressed as a vector. In the basis of the vector, the spin is in a downward state or an upward state. For example, each state is associated with a numerical value of 0 or 1.

As described above, the control of the electron spin 101 of changing the state of the spin associated with the numerical value, for example, from an up state to a down state is operated by a quantum computer. The characteristic of a quantum bit is that it is possible to superpose the up state and the down state. Handling a superposition state of 0 and 1 is one of the characteristics of the quantum computer.

FIG. 2 is a diagram illustrating a basic structure of a quantum bit semiconductor device of an electron spin method.

The quantum bit semiconductor device includes gate electrodes 201-1 to 201-5, insulating layers 202 and 205, and a semiconductor layer 203. Such a structure is the same structure as that of an electrostatic effect transistor. A voltage is applied to a gate electrode, and an electron in the semiconductor layer is trapped by an electrostatic effect. The electron is used as a quantum bit. On the contrary, the electron can also be excluded by applying a negative voltage.

The electron is methodologically arranged by combining the trapping and the exclusion. The electron is trapped in a valley portion of an electrostatic potential 204 in FIG. 2. In a two-quantum bit operation, the height of the mountain of the potential separating two electrons is controlled by a voltage applied to the gate electrode 201-3.

FIG. 17 illustrates the state of the quantum device in which quantum dots are arranged in the shape of an array.

In a quantum bit array 171, a plurality of quantum bits are formed into the shape of a two-dimensional tetragonal lattice, and an interaction (a potential barrier) between the quantum dots is formed. In addition, a gate electrode of a semiconductor (for example, polysilicon) is provided. There are two types of gate electrodes of a quantum dot control gate 172 and an exchange interaction control gate 173.

The quantum dot control gate 172 and the exchange interaction control gate 173 are alternately arranged in two layers directly above a substrate. The quantum dot control gate 172 is used for controlling an one-quantum gate manipulation. The exchange interaction control gate 173 is used for controlling a two-quantum gate manipulation.

FIG. 3 is a diagram illustrating how a quantum processor 304 is described as a transistor circuit.

Such a circuit diagram is described by using three types of transistors 301 to 303. The transistor 301 is a tripolar transistor, and represents a transistor for trapping an electron. The transistor 302 is a pentapolar transistor, and represents a transistor for trapping an electron. Channels are connected to the transistor 302 in four directions of up, down, left, and right. By such four-direction connection, the quantum processor 304 can be configured two-dimensionally.

The transistor 303 represents a barrier transistor for excluding an electron. The transistor 303 corresponds to 201-3 in FIG. 2, and the two-quantum bit operation is executed by changing a gate voltage of the transistor 303.

The characteristic of FIG. 3 is that three types of transistors 301, 302, and 303 are used, and the transistors 301, 302, and 303 share the gate electrode. The arrangement of the transistors that share the gate electrode enables two-dimensional arrangement of the quantum processor 304. Note that, the arrangement of each of the transistors 301, 302, and 303 in FIG. 3 is merely illustrated as an example.

As illustrated in FIG. 17, a common control gate line is the quantum dot control gate 172 and the exchange interaction control gate 173. In addition, in the quantum processor 304, a source/drain is provided in addition to the quantum dot control gate 172 and the exchange interaction control gate 173.

FIG. 4 illustrates a configuration diagram of the entire quantum computer system including the quantum processor in FIG. 3.

304 is the quantum processor described in FIG. 3. 402 is an antenna for a microwave that is required for controlling the quantum processor. As a circuit driving the quantum processor 304 and the antenna 402, a quantum processor driving unit (a control unit) 401 is used. The quantum processor driving unit 401 is controlled by a general host computer 403. A communication route 404 is provided between the quantum processor driving unit 401 and the host computer 403.

Here, the host computer 403, for example, includes a main storage device, a general operation device, a control device, an auxiliary storage device, an input device, an output device, and the like.

A relationship between the gate voltage application to each of the transistors and the electron trapping will be described with reference to FIG. 5 to FIG. 10.

FIG. 5 is an example of a method for applying a voltage to the gate electrode. Such an example corresponds to the case of applying a voltage to the gate electrode of the transistors 301 and 302 for trapping an electron. The gate electrode is a gate electrode indicated by a black terminal similar to 304-1 or 304-1.

Next, a simulation result will be described in which the prediction of electron supplement in the scale of the quantum processor 304 having a total 56 electrons including eight electrons in a vertical direction and seven electrons in a horizontal direction is based on an equivalent circuit. Note that, in such a simulation, the capacity of the transistor is set to a typical value.

FIG. 6 illustrates the electron supplement with respect to the voltage application to the gate electrode illustrated in FIG. 5.

All the voltages to be applied to the gate electrodes of the transistors are the same. As illustrated in the upper portion of FIG. 6, each of the transistors in the quantum processor is supplemented with the electron as the gate voltage with respect to each voltage is heightened.

A voltage margin in which all the transistors are supplemented with the electron is approximately 0.4 V. Even though the gate voltage is the same outside the range, there are two types of transistors including a transistor that is supplemented with the electron and a transistor that is not supplemented with the electron. A coulomb interaction between the electrons causes such a result.

The simulation result indicates that weak electron trapping is likely to occur in the center portion or the edge portion of the quantum processor in the case of falling outside the range of the voltage margin.

FIG. 7 illustrates the electron trapping with respect to the gate voltage only for a transistor in a region other than the center portion or the edge portion illustrated in the drawing.

By restricting the range in the quantum processor, it is possible to enlarge the voltage margin from approximately 0.4 V to approximately 2.0 V.

FIG. 8 is another example of the method for applying the voltage to the gate electrode. Such an example corresponds to the case of applying the voltage to the gate electrode of the barrier transistor. The gate electrode is a gate electrode indicated by a black terminal similar to 304-2 or 304-2.

FIG. 9 illustrates the electron supplement with respect to the voltage application to the gate electrode illustrated in FIG. 8.

All the voltages to be applied to the gate electrodes of the transistors are the same. The voltage margin in a case where the region of the quantum processor is not restricted is approximately 1.4 V.

FIG. 10 illustrates the electron supplement in a case where the range is restricted to a range illustrated in the drawing.

FIG. 10 illustrates the electron supplement with respect to the gate voltage only for a transistor in a region other than the edge portion illustrated in the drawing. As described above, a voltage margin of greater than 5 V is obtained by restricting the range.

As described above, in the quantum processor, a larger voltage margin can be obtained by restricting the region to be used.

Note that, the carrier of the semiconductor includes an electron and a hole. The hole may be used instead of the electron.

Next, an example of restricting the region will be described with reference to FIG. 11 to FIG. 15.

FIG. 11 illustrates an example of restricting the region with respect to the left edge portion and the right edge portion.

There are also quantum bits in the left edge portion and the right edge portion, but the use is restricted to the range of quantum bits excluding such quantum bits with a narrow margin.

Note that, the number of quantum bits to be restricted in this case is less than or equal to half the total number of transistors 301 and 302 for trapping an electron and barrier transistors 303. In addition, the number of quantum bits to be restricted in order to perform a practical operation is two or more.

FIG. 12 illustrates an example of restricting the region with respect to the left edge portion, the right edge portion, and the center portion.

There are also quantum bits in the left edge portion, the right edge portion, and the center portion, but the use is restricted to the range of quantum bits excluding such quantum bits with a narrow margin.

Note that, the number of quantum bits to be restricted in this case is less than or equal to half the total number of transistors 301 and 302 for trapping an electron and barrier transistors 303. In addition, the number of quantum bits to be restricted in order to perform a practical operation is two or more.

FIG. 13 illustrates an example of restricting the region with respect to the upper edge portion and the lower edge portion.

There are also quantum bits in the upper edge portion and the lower edge portion, but the use is restricted to the range of quantum bits excluding such quantum bits with a narrow margin.

Note that, the number of quantum bits to be restricted in this case is less than or equal to half the total number of transistors 301 and 302 for trapping an electron and barrier transistors 303. In addition, the number of quantum bits to be restricted in order to perform a practical operation is two or more.

FIG. 14 illustrates an example of restricting the region with respect to the upper edge portion, the lower edge portion, and the center portion.

There are also quantum bits in the upper edge portion, the lower edge portion, and the center portion, but the use is restricted to the range of quantum bits excluding such quantum bits with a narrow margin.

Note that, the number of quantum bits to be restricted in this case is less than or equal to half the total number of transistors 301 and 302 for trapping an electron and barrier transistors 303. In addition, the number of quantum bits to be restricted in order to perform a practical operation is two or more.

FIG. 15 illustrates an example of restricting the region with respect to the left edge portion, the right edge portion, the upper edge portion, the lower edge portion, and the center portion.

There are also quantum bits in the left edge portion, the right edge portion, the upper edge portion, the lower edge portion, and the center portion, but the use is restricted to the range of quantum bits excluding such quantum bits with a narrow margin.

Note that, the number of quantum bits to be restricted in this case is less than or equal to half the total number of transistors 301 and 302 for trapping an electron and barrier transistors 303. In addition, the number of quantum bits to be restricted in order to perform a practical operation is two or more.

FIG. 16 illustrates an operation that is required for the quantum processor and an operation that is executed by the quantum processor.

The use region of the quantum processor is restricted as described above. In a case where the operation that is required extends across the quantum bits in different regions, the operation is changed to the operation of the quantum bits in the same region. Such a change is performed in the quantum processor driving unit 401 or the host computer 403 of FIG. 4.

As described above, the control unit (the quantum processor driving unit 401 or the host computer 403) performs control such that the number of quantum bits operated in the quantum bit array is less than or equal to half the total number of transistors. In addition, the control unit (the quantum processor driving unit 401 or the host computer 403) performs control such that the number of quantum bits operated in the quantum bit array is two or more.

According to the example described above, it is possible to reduce the operation error due to the weak electron trapping by using only the electrons with a comparatively large voltage margin in quantum calculation.

What is claimed is:

1. A quantum information processing device, comprising:
a quantum bit array in which a plurality of quantum bits are arranged into the shape of a two-dimensional tetragonal lattice;
a control unit controlling the quantum bit array; and
a common control gate line capable of controlling the plurality of quantum bits,
wherein the common control gate line is commonly connected to each of a plurality of transistors, and
the control unit performs control such that the number of quantum bits operated in the quantum bit array is less than or equal to half the total number of transistors, wherein the control unit performs control such that the quantum bit arranged in a center portion of the quantum bit array is in a non-operational state.

2. The quantum information processing device according to claim 1,
wherein the control unit performs control such that the number of quantum bits operated in the quantum bit array is two or more.

3. The quantum information processing device according to claim 1,
wherein the control unit performs control such that the quantum bit arranged in an edge portion of the quantum bit array is in a non-operational state.

4. The quantum information processing device according to claim 1,
wherein the transistor is a transistor for trapping an electron or a barrier transistor.

5. The quantum information processing device according to claim 1,
wherein the quantum bit is an electron or a hole.

6. A quantum information processing system, comprising:
the quantum information processing device according to claim 1; and
a host computer controlling the quantum information processing device.

7. A quantum information processing device, comprising:
a quantum bit array in which a plurality of quantum bits are arranged into the shape of a two-dimensional tetragonal lattice;
a control unit controlling the quantum bit array; and
a common control gate line capable of controlling the plurality of quantum bits,
wherein the common control gate line is commonly connected to each of a plurality of transistors, and
the control unit performs control such that the number of quantum bits operated in the quantum bit array is less than or equal to half the total number of transistors,
wherein the control unit performs control such that the quantum bit arranged in a center portion and an edge portion of the quantum bit array is in a non-operational state.

* * * * *